United States Patent
Henry et al.

(10) Patent No.: US 9,747,142 B2
(45) Date of Patent: Aug. 29, 2017

(54) METHOD FOR CENTRALIZING EVENTS FOR A MULTILEVEL HIERARCHICAL COMPUTER MANAGEMENT SYSTEM

(75) Inventors: Manuel Henry, Tilly (FR); Valérian Rossigneux, Montigny-le-Bretonneux (FR)

(73) Assignee: CASSIDIAN SAS, Elancourt (FR)

(*) Notice: Subject to any disclaimer, the term of this patent is extended or adjusted under 35 U.S.C. 154(b) by 0 days.

(21) Appl. No.: 13/818,801

(22) PCT Filed: Aug. 26, 2011

(86) PCT No.: PCT/EP2011/064771
§ 371 (c)(1),
(2), (4) Date: Feb. 25, 2013

(87) PCT Pub. No.: WO2012/025631
PCT Pub. Date: Mar. 1, 2012

(65) Prior Publication Data
US 2013/0160030 A1    Jun. 20, 2013

(30) Foreign Application Priority Data
Aug. 27, 2010 (FR) .................................. 10 56830

(51) Int. Cl.
*G06F 3/00* (2006.01)
*G06F 9/44* (2006.01)
(Continued)

(52) U.S. Cl.
CPC .......... *G06F 9/542* (2013.01); *H04L 12/2411* (2013.01); *H04L 12/2456* (2013.01); *H04L 41/0618* (2013.01); *H04L 41/0631* (2013.01)

(58) Field of Classification Search
None
See application file for complete search history.

(56) References Cited

U.S. PATENT DOCUMENTS 6,370,494 B1 * 4/2002 Mizuno et al. ................. 703/17
6,421,676 B1   7/2002 Krishnamurthy et al.
(Continued)

FOREIGN PATENT DOCUMENTS

| EP | 1 471 428 B1 | 10/2006 |
|---|---|---|
| WO | WO 00/72513 | 11/2000 |
| WO | WO 2009/003513 | 1/2009 |

OTHER PUBLICATIONS

International Search Report as issued for PCT/EP2011/064771.

*Primary Examiner* — Craig Dorais
(74) *Attorney, Agent, or Firm* — Pillsbury Winthrop Shaw Pittman LLP

(57) ABSTRACT

A method for centralizing events for a multilevel hierarchical computer management system, the system including a plurality of source equipments generating events and a plurality of event collectors per level, the method including selecting by an upper level collector a lower level collector according to operational parameters and/or a link quality of service of the lower level collector; receiving by the collector the events from the selected lower level collector; periodically verifying if the selected collector is available and if not repeating the selection step; and comparing by the upper level collector its events with those from the unselected lower level collectors and receiving from one of these unselected lower level collectors the events that are different.

15 Claims, 8 Drawing Sheets

(51) Int. Cl.
*G06F 9/46* (2006.01)
*G06F 13/00* (2006.01)
*G06F 9/54* (2006.01)
*H04L 12/24* (2006.01)

(56) References Cited

U.S. PATENT DOCUMENTS

| | | |
|---|---|---|
| 8,095,684 B2* | 1/2012 | Stryker et al. ................ 709/241 |
| 8,122,122 B1* | 2/2012 | Clingenpeel et al. ........ 709/224 |
| 2003/0083908 A1* | 5/2003 | Steinmann ............. G06Q 40/08 705/4 |
| 2008/0209448 A1* | 8/2008 | Ayres et al. .................. 719/321 |

\* cited by examiner

METHOD FOR CENTRALIZING EVENTS FOR A MULTILEVEL HIERARCHICAL COMPUTER MANAGEMENT SYSTEM

CROSS-REFERENCE TO RELATED APPLICATIONS

This is the U.S. National Stage of PCT/EP2011/064771, filed Aug. 26, 2011, which in turn claims priority to French Patent Application No. 1056830, filed Aug. 27, 2010, the entire contents of all applications are incorporated herein by reference in their entireties.

TECHNICAL FIELD

The present invention relates to a method for centralizing events for a multilevel hierarchical computer management system. The invention also relates to a multilevel hierarchical computer management system enabling said method to be implemented.

The invention finds a particular application in the field of computer network management centers that manage a plurality of sites.

TECHNOLOGICAL BACKGROUND OF THE INVENTION

In the field of computer network management centers, a known prior art method for centralizing events for a multilevel hierarchical computer management system comprises the steps of recording the events from each source equipment in a first event collector. If this first collector fails, then a second collector is manually activated by an operator to record events instead of the first collector that has failed.

A disadvantage of this prior art is that a latency exists between the time when the failure of the first collector is detected and the time the second collector is put into place. Thus, events are lost during this latency. In addition, the manual placement of this second collector is cumbersome to manage.

GENERAL DESCRIPTION OF THE INVENTION

The object of the present invention is to define a method for centralizing event logs for a multilevel hierarchical computer management system that enables the problems posed above to be resolved.

This object is reached by a method for centralizing events for a multilevel hierarchical computer management system, said system comprising a plurality of source equipment generating events and a plurality of event collectors per level, said method comprising the steps of:
  selecting by an upper level collector a lower level collector according to operational parameters and/or a link quality of service of said lower level collector;
  receiving by said collector the events from said selected lower level collector;
  periodically verifying if the selected lower level collector is available and if not repeating the selection step; and
  comparing by said upper level collector its events with those from the unselected lower level collectors and receiving from one of these unselected lower level collectors the events that are different.

As will be seen in detail subsequently, the placement of the automatic method that selects the best collector at a given time and that verifies the concordance between the events from an upper level collector with those from the lower level ensures that all of the events at the highest hierarchical level are centralized without manual intervention. In addition, the method enables reliable centralizing since the centralizing of events is not stopped if the selected collector becomes unavailable.

According to non-limitative embodiments, the method may also comprise one or more additional characteristics from among the following:
  The centralizing method comprises an additional step of recording all the events generated by source equipment in collectors of the same hierarchical level as the source equipment. This enables a collector to group together all of the events generated by the source equipment.
  The step of comparing the events from the upper level collector with those from unselected lower level collectors is carried out periodically. If events have been lost, this enables an event recovery procedure to be launched and thus ensures that all of the events are always moved up to the upper collector.
  The step of comparing the events from an upper level collector with those from unselected lower level collectors is carried out according to a hash associated with the events. This enables events to be differentiated from each other and each event to be uniquely identified.
  The step of comparing the events from an upper level collector with those from unselected lower level collectors is also carried out according to a timestamp. This enables events to be classified according to their date and time of appearance and events to be searched for by date and time.
  The operational parameters utilized at the lower level collector selection step comprise the number of events and/or material capacities and/or consumption parameters. Thus, static capacities, i.e., physical capacities of the material, and dynamic capacities (during use) of a collector are taken into account.
  The substep of receiving different events is carried out for example according to the TCP/IP communication protocol. This protocol is a protocol that enables events to be reliably delivered. It verifies that the data packets (events) have arrived at their destination, and guarantees their arrival in order.
  The centralizing method also comprises an initial step of searching for lower level collectors by an upper level collector. This allows all of the lower level collectors to be known, and by thus having an additional criterion in the lower level collector selection step, enables the best lower level collector to be selected from among all lower level collectors.
  The method comprises an additional step of transmitting by a collector its own events to all the other collectors in the same hierarchical level. Thus, centralizing events also applies to events specific to the collectors.
  The transmission step is carried out for example according to the UDP communication protocol. This protocol is easy to implement.

In addition, a collector for a multilevel hierarchical computer management system is also proposed, said system comprising a plurality of source equipment generating events and a plurality of event collectors per level, said collector being able to log events generated by the source equipment of said multilevel hierarchical computer management system, said system collector comprising:
  means for selecting a lower level collector according to the operational parameters and/or as a link quality of service from said lower level collector;

means for receiving events from said selected lower level collector;

means for verifying periodically the availability of the selected collector and, if not available, means for repeating the selection step;

means for comparing its events with those from the unselected lower level collectors; and means for receiving events that are different from one of these unselected lower level collectors.

According to a non-limitative embodiment, the collector also comprises means for recording all of the events generated by source equipment of the same hierarchical level.

In addition, a multilevel hierarchical computer management system able to log events generated by source equipment is also proposed, said system comprising a plurality of source equipment generating events and a plurality of event collectors per level, the collectors being characterized according to any one of the previous characteristics.

In addition, a computer program product comprising one or more sequences of instructions executable by an information processing unit is also proposed, the execution of said instruction sequences enabling an implementation of the method according to any one of the previous characteristics, when it is loaded on a computer.

The invention and its various applications will be better understood upon reading the following description and examining the accompanying figures.

BRIEF DESCRIPTION OF THE FIGURES

The figures are presented for indicative purposes and in no way limit the invention.

DESCRIPTION OF EMBODIMENTS OF THE INVENTION

Figure 2:
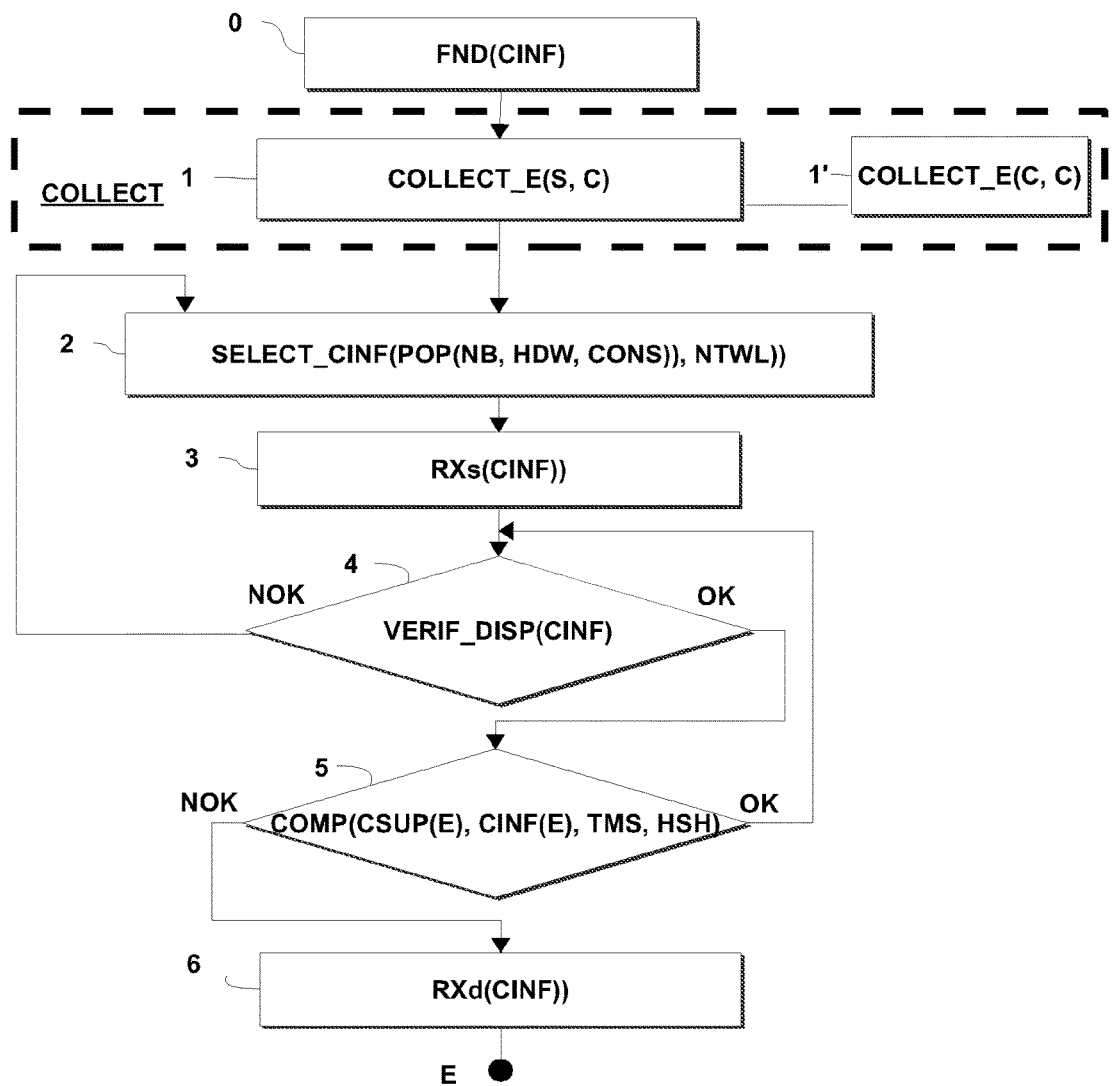
FIG. 2 is a simplified flow chart of a non-limitative embodiment of the centralizing method according to the invention.

The event centralizing method for a multilevel hierarchical computer management system is described in a non-limitative embodiment in FIG. 2.

It is implemented in a multilevel hierarchical computer management system, said system comprising a plurality of source equipment generating events and a plurality of event collectors per level.

Source equipment is understood to refer to any computer equipment such as a server, router or personal computer in non-limitative examples.

Event is understood to refer to any event transmitted by a source equipment S, such as in non-limitative examples, security events (a user is connected to a source equipment, a process reboots, a source equipment reboots, a connection to sensitive information is established, a change of status of a resource is performed, etc.), or debugging events or else events transmitted by the collectors themselves.

Availability of a collector is understood to refer to a collector that operates and whose network link with an upper collector is not broken. It will be noted that in a non-limitative embodiment, a collector is a server that may be dedicated to the function of collecting events, or may be shared with other services.

It will be noted that in the description, the term computer management system or information system is used interchangeably.

Figure 1:
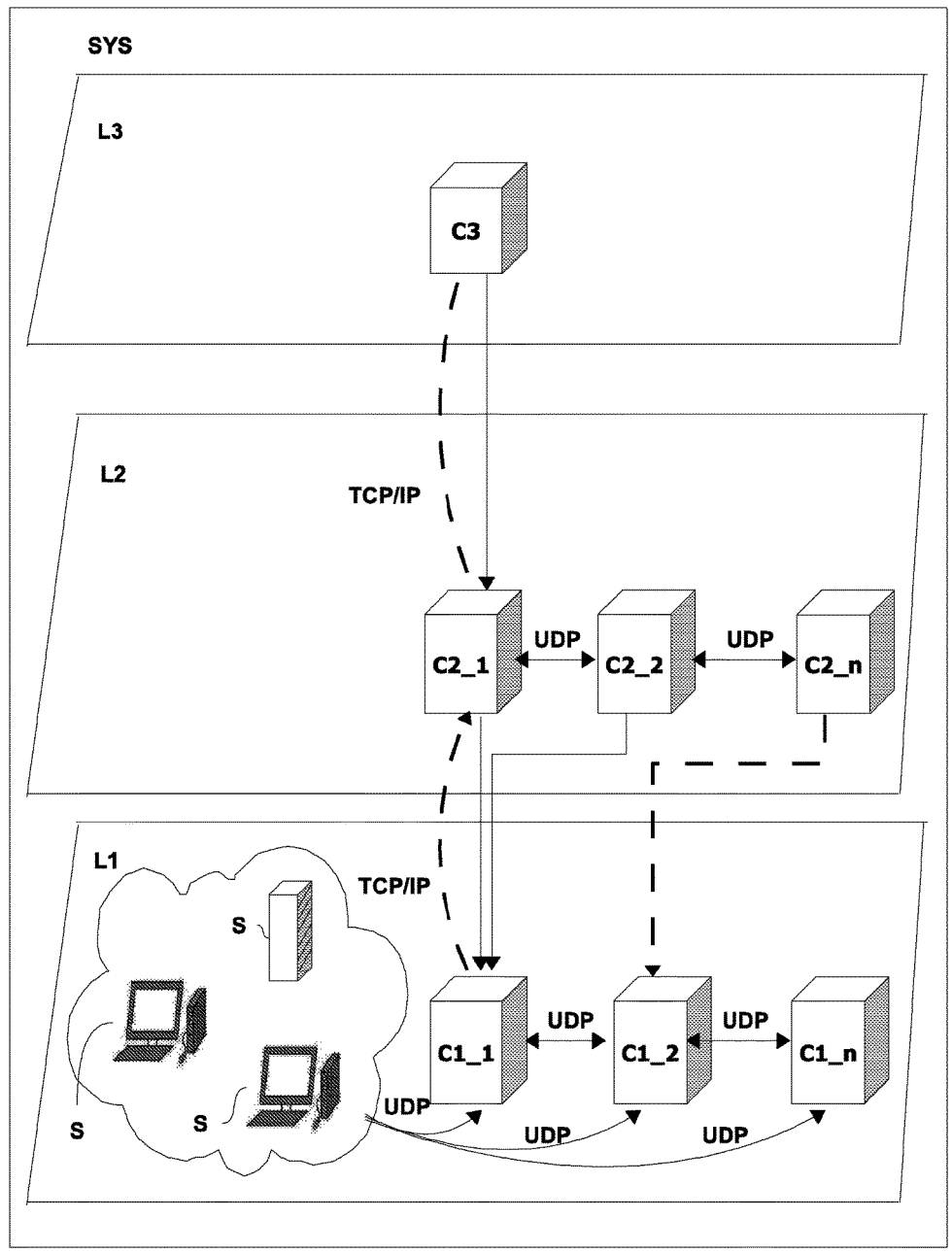
FIG. 1 is a simplified schematic drawing of a non-limitative example of a multilevel hierarchical computer management system comprising a plurality of source equipment generating events and a plurality of event collectors, in which the centralizing method according to the invention is implemented.

A non-limitative example of a multilevel hierarchical computer system SYS is schematically illustrated in FIG. 1. In this example, the SYS information system is computer management system for a pool of computer equipment within a company. The system comprises three hierarchical levels:

a first level L1 relative to a company department;
a second level L2 relative to a site where the company premises are situated;
A third level L3 relative to a country in which the company is established.

In the non-limitative example from FIG. 1:
the first level L1 comprises source equipment S and a plurality of first collectors C1: C1_1 to C1_n.
the second level L2 comprises a plurality of second collectors C2: C2_1 to C2_n.
The third level L3 comprises a third collector C3 called a main collector.

The third level L3 is also called the upper level LSUP with relation to the second level L2 that is called the lower level with relation to the third level L3. In the same manner, the second level L2 is also called the upper level LSUP with relation to the first level L1, that is called the lower level LINF with relation to the second level L2.

Thus, the first collectors C1 are called lower level collectors CINF (or lower collectors) with relation to the second collectors C2. These second collectors C2 are called upper level collectors CSUP (or upper collectors) with relation to the C1 collectors, but are called lower level collectors CINF with relation to the third collector C3. The latter is called an upper level collector CSUP (or upper collector) with relation to the second collectors C2.

It will be noted that in a multilevel hierarchical system, an upper level collector only knows the collectors from the level directly below it. Thus, collector C3 only knows C2 collectors. It does not know (and thus has no direct access to) C1 collectors.

In a non-limitative embodiment, the method for centralizing events for a multilevel hierarchical management system SYS comprises the steps of (as illustrated in FIG. 2):

selecting by a collector CSUP from an upper level LSUP a collector CINF from a lower level LINF according to operational parameters POP and/or a link quality of service NTWL of said lower level LINF collector CINF (step SELECT_CINF(POP(NB, HDW, CONS), NTWL));

receiving by said collector CSUP the events from said selected lower level collector CINF (step RXs(CINF));

periodically verifying if the selected lower level collector CINF is available and if not repeating the selection step (step VERIF_DISP(CINF)); and—comparing by an upper level LSUP collector CSUP its events E with those from unselected lower level collectors CINF (step COMP(CSUP(E), CINF(E), TMS, HSH) and receiving from one of these unselected lower level collectors CINF events E that are different (step RXd(CINF)).

In a non-limitative embodiment, the events E centralizing method also comprises an initial step of searching for lower level LINF collectors CINF by an upper level LSUP collector CSUP (step FND(CINF)).

In a non-limitative embodiment, the events E centralizing method comprises an additional step of recording all events E generated by source equipment S in collectors C of the same hierarchical level as the source equipment S (step COLLECT_E(S, C)).

In a non-limitative embodiment, the step of comparing the events from the upper level collector with those from unselected lower level collectors is carried out periodically.

For the rest of the description, in the non-limitative embodiment of the method described, the method comprises this initial step and these additional steps.

Thus, the steps of the event centralizing method are described in detail below by referring to FIGS. 1 to 7.

In an initial step 0) illustrated in FIG. 2, lower level LINF collectors CINF are searched for by an upper level LSUP collector CSUP.

In the non-limitative example from FIG. 1, each upper level collector C2 will search for all lower level collectors C1.

In a first non-limitative example, lower collectors C1 are previously recorded in a configuration of each upper collector C2 such that the latter knows which lower collectors C1 belong to the lower level L1. This configuration is done upstream by an information system SYS administrator who has rights to modify said configuration. In a non-limitative example, the configuration is carried out with the IP addresses of collectors C1.

In a second non-limitative example, each upper level collector C2 sends a broadcast message to the lower level L1. All lower level collectors C1 that are available receive this broadcast message and send a reply message when they receive said broadcast message. Collector C2 thus recognizes which lower level collectors C1 belong to the lower level L1. In a non-limitative example, UDP (User Datagram Protocol) protocol, well known to the person skilled in the art, is utilized to send a broadcast message. This protocol is simple to use, does not require significant network resources and enables data (here messages) to be quickly sent.

In a third non-limitative example, when a lower level collector C1 is installed, it sends a broadcast message to all upper level L2 collectors C2. All upper level collectors C2 that are available send a reply message when they receive said broadcast message. Collector C1 thus recognizes the upper level collectors C2. In a non-limitative example, the UDP protocol is utilized to send a broadcast message.

Figure 3:
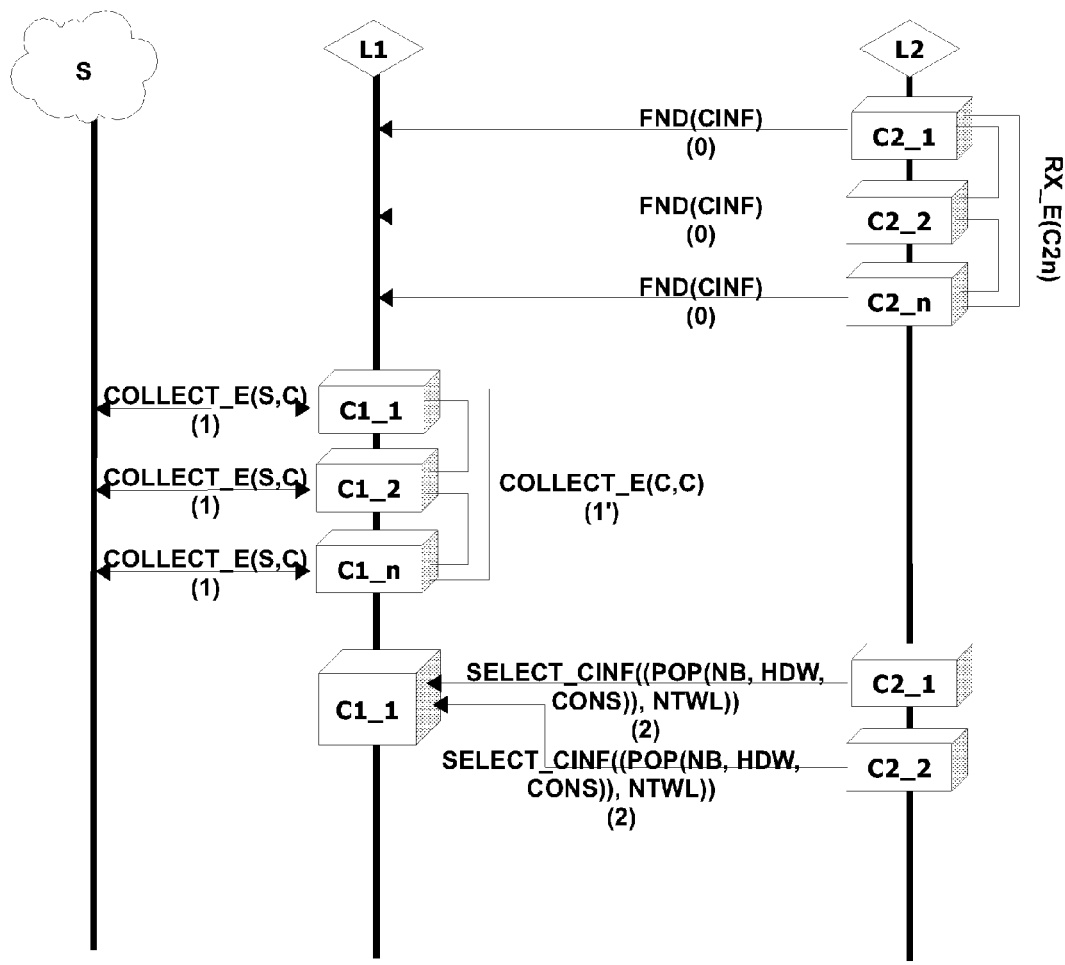
FIG. 3, FIG. 4, FIG. 5, and FIG. 6 schematically illustrate the steps of centralizing events between collectors of different levels according to a non-limitative embodiment of the method from FIG. 2.

In a first step 1) illustrated in FIG. 2 and FIG. 3, all the events E generated by source equipment S in collectors C of the same hierarchical level as the source equipment S are recorded.

In the non-limitative example of a multilevel hierarchical computer system SYS from FIG. 1, this recording is carried out at the lowest level, i.e., the first level L1. Of course, in the case of other examples where the second level L2 and/or third level L3 would also comprise source equipment S, this step would apply to said second and/or third level.

In a first non-limitative embodiment, the recording is carried out on the initiative of the source equipment S, i.e., the transmitters of an event E. This mode is called the "push" mode. Once a source equipment S transmits an event E, it sends it to all the collectors on the same hierarchical level as itself. In a non-limitative example of embodiment, the SYSLOG UDP protocol, well known to the person skilled in the art, is used.

In a second non-limitative embodiment, the recording is carried out on the initiative of the collectors C, i.e., the receivers of an event E. This mode is called the "pull" mode.

In this case, collectors C remotely access (by any communication protocol known to the person skilled in the art such as FTP (File Transfer Protocol), ODBC (Open Database Connectivity) or else WMI (Windows Management Instrumentation) in non-limitative examples) source equipment at the same hierarchical level and collectors C repeat the events locally at their location.

In a third non-limitative embodiment, the recording is done by means of an agent deployed in the source equipment S. This example is of interest when the event sending function does not reside in the source equipment. In this case, a local process is executed by the agent, that recovers the events from a source equipment and sends them to the associated collectors (of the same hierarchical level). In a non-limitative example of embodiment, an encoded communication protocol is used, such as the TLS (Transport Layer Security) protocol that enables the events to be encoded before sending them to collectors C.

It will be noted that in an additional step 1') illustrated in FIG. 2 and FIG. 3, each collector C transmits its own events E to all other collectors C of the same hierarchical level L (step COLLECT_E(C, C) illustrated in FIG. 1 by horizontal arrows and in FIGS. 2 and 3). In a non-limitative example, the UDP protocol, well known to the person skilled in the art, is used. For example, a collector may comprise elements to authenticate a user who is authenticated on said collector or else events relative to the launching or stopping of applications on said collector.

Thus, all events E are recorded in collectors of the same level (phase illustrated in FIG. 2 by the box in broken lines named COLLECT).

It will be noted that the initial step 0) of searching for lower collectors is independent from the event recording phase and thus may be done in parallel, before or after.

In a second step 2), illustrated in FIG. 2 and FIG. 3, a collector CINF from a lower level LINF is selected by a collector CSUP from an upper level LSUP according to operational parameters POP and/or a link quality of service NTWL of said lower level LINF collector CINF.

This selection will allow the best lower level LINF collector CINF at a given time to be selected.

In a non-limitative embodiment, the operational parameters POP comprise:
  the number NB of events E, and/or
  the material capacities HDW, i.e., static capacities such as:
    CPU (power for example),
    memory (capacity for example),
    disk characteristics (speed, reliability level, access performance, for example), and/or
  consumption parameters CONS, i.e., operational dynamics such as:
    CPU (speed for example),
    load time, etc.,
    memory (consumption for example),
    IO status (disk access for example)
Of said lower level LINF collector.

Thus, for example, a collector that will have a CPU load time of less than 50% will be considered better than a collector that will have a longer CPU load time.

In the non-limitative examples, a link quality of service NTWL relates to the bandwidth allocated to record events, overloading of the network link, etc. Thus, for example, a collector that will have a faster movement of events on the network link will be better than a collector whose movement will be slower due to an overload of data on its network communication link.

Thus, the best collector from the lower level CINF is chosen, particularly according to the criteria above. It will be noted that a collector is the best collector at a given time. In fact, as the operational parameters POP (particularly dynamic parameters) and the link quality of service NTWL vary over time, a collector that was the best at a given time may no longer be the best later. Thus, a lower level collector CINF may be selected as the best by an upper level collector CSUP, but not by another upper level collector CSUP. This case may happen for example every time an upper level collector CSUP restarts. In this case, said collector CSUP will do a new search for the best lower level collector CINF according to the criteria above. Thus, the collector CSUP will resynchronize with the best lower collector CINF.

In the non-limitative example from FIG. 1, upper level collectors $C2\_1$ and $C2\_2$ selected lower level collector $C1\_1$ as being the best (continuous arrow), while upper level collector $C2\_n$ chose collector $C1\_2$ as being the best (broken arrow).

Thus, after selecting the best lower collector $C1\_1$, events E may be moved to upper collector $C2\_1$ and $C2\_2$ (illustrated in FIG. 2 by the box in broken lines named RETRV).

The same is true for moving events to collector $C2\_n$ from collector $C1\_2$. For the sake of conciseness, only the example with collectors $C2\_1$ and $C1\_1$ is described below.

Figure 4:
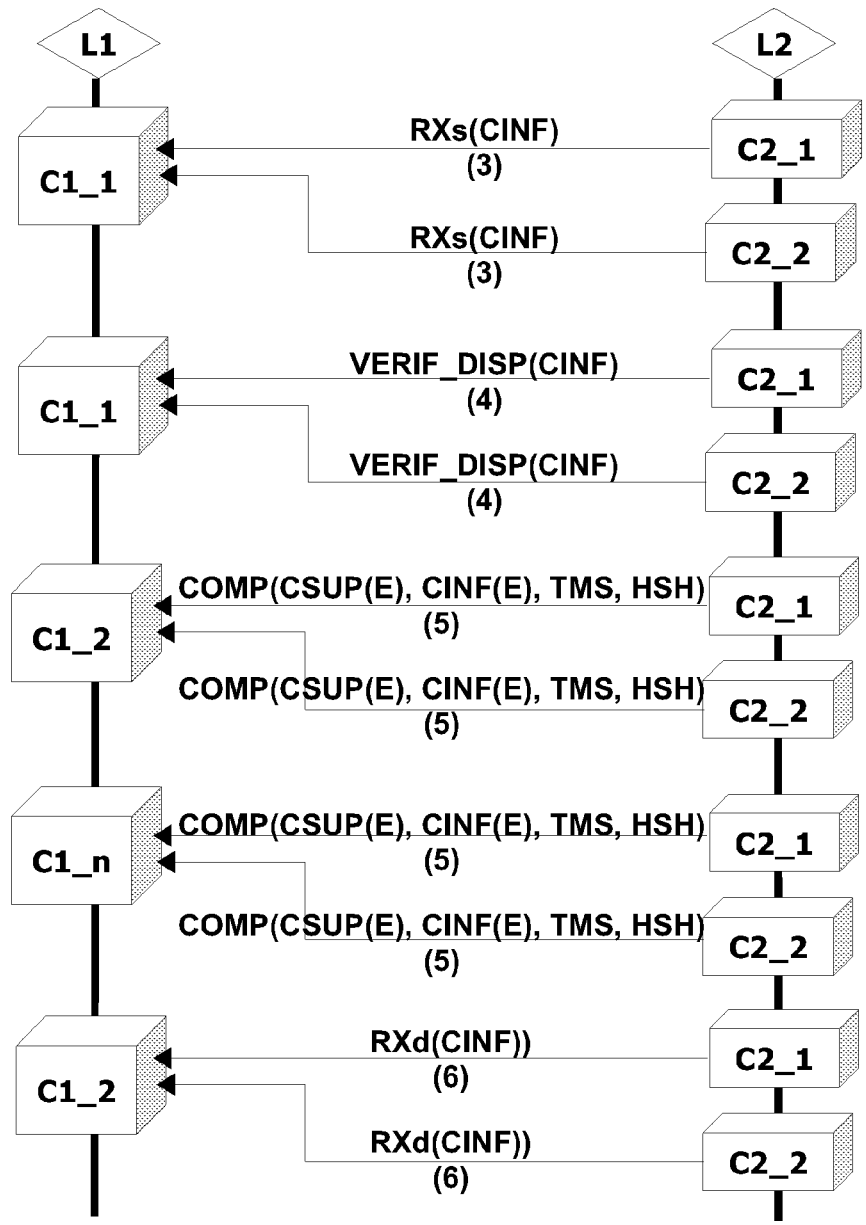

In a third step 3), illustrated in FIG. 2 and FIG. 4, the events from said selected lower level collector CINF are received by said upper level collector CSUP.

In a non-limitative embodiment, receiving events E is carried out for example according to the TCP/IP communication protocol. This protocol enables reliable receipt of events by an upper collector CSUP since said protocol ensures the arrival of data (events) without alteration, in order, with retransmission in case of loss, and eliminates duplicated data.

In the example taken from FIG. 4, upper collectors $C2\_1$ and $C2\_2$ thus receive events E from lower collector $C1\_1$.

In a fourth step 4) illustrated in FIG. 2 and FIG. 4, when the best collector from lower level CINF is selected, one periodically verifies if the selected collector CINF is available and if not, the previous selection step is repeated (or step 2).

Verification is based on the periodic generation of a signal to verify that the lower collector is still operating.

In a first non-limitative example, a verification mechanism commonly called a "heartbeat" that is well known to the person skilled in the art may be used. In this case, the lower collector CINF informs the upper collectors CSUP that it is available, by sending a message to said upper collectors CSUP.

In a second non-limitative example, a "ping" (Packet Internet Groper) application software utility that is well known to the person skilled in the art may be used. In this case, verification is done by each upper collector CSUP that sends a message to a lower collector CINF to verify its availability.

Thus, if a selected lower level collector CINF becomes unavailable (i.e., an upper collector CSUP no longer can access said lower collector CINF), then another lower collector CINF will be selected in its place. Thus, the previous selection step is executed again, as well as the comparison and receipt steps described later.

Thus, events continue to be centralized even if a lower collector CINF becomes unavailable. It is noted that in the non-limitative examples, a lower collector becomes unavailable when it no longer operates, when the communication link between it and the upper collector is broken, etc.

Figure 7:
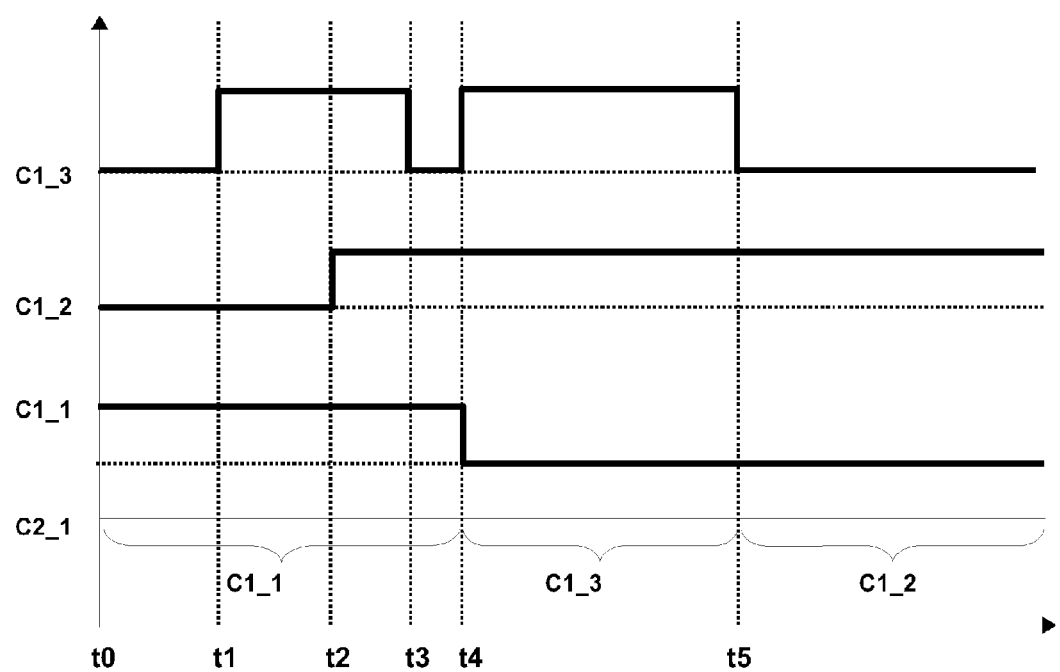
FIG. 7 is a timing diagram that schematically illustrates a step of verifying the availability of a collector, a step from the centralizing method from FIG. 2.

FIG. 7 is a timing diagram schematically illustrating this verification step by the upper collector $C2\_1$.

At time t0, lower collector $C1\_1$ has already been selected and is available. Events E are recovered by collector $C2\_1$ from collector $C1\_1$. Collector $C1\_2$ as well as collector $C1\_3$ are unavailable.

At time t1, a first verification is done, the lower collector $C1\_1$ is still available, collector $C1\_3$ has become available, collector $C1\_2$ is still unavailable.

At time t2, a second verification is done, the lower collector $C1\_1$ is still available, collector $C1\_3$ is still available, collector $C1\_2$ has become available.

At time t3, a third verification is done, the lower collector $C1\_1$ is still available, collector $C1\_3$ has become unavailable, collector $C1\_2$ is still available. Thus, up to time t4, events E are recovered by collector C2-1 from collector $C1\_1$.

At time t4, a fourth verification is done, the lower collector $C1\_1$ has become unavailable, collector $C1\_3$ has become available again, collector $C1\_2$ is still available. At this time, the selection step (step 2 seen earlier) is repeated. In the example, collector $C1\_3$ will be selected as being the best. Upper collector $C2\_1$ thus recovers events E from this best collector $C1\_3$.

At time t5, a fifth verification is done, the lower collector $C1\_1$ is still unavailable, collector $C1\_3$ has become unavailable, collector $C1\_2$ is still available. At this time, the selection step (step 2 seen earlier) is repeated. In the example, collector $C1\_2$ will be selected as being the best. Upper collector $C2\_1$ thus recovers events E from this best collector $C1\_2$.

In a non-limitative embodiment, the step of repeating the step of selecting another lower collector CINF is carried out from the last event E received from the lower level collector selected previously.

The upper collector CSUP selects another best lower collector CINF by taking into account the last recorded event E received from the lower collector CINF selected previously. Thus, the upper collector CSUP is resynchronized with a new lower collector CINF from this last event E (by thus taking its timestamp and hash into account). It thus receives from the new lower collector CINF the events E received after the last event E received from the previous lower collector CINF (by comparing their hash and timestamp with those from said last event E).

In the case where the upper collector CSUP does not find this last event E in the new selected lower collector CINF, it requests to receive from this latter the events E that have a timestamp (particularly the hour) TMP with a given time T prior to the timestamp TMP of said last event E (received from the best previous lower collector).

Thus, in the example described previously, at time t4, for example the upper collector $C2\_1$ will receive from the new selected lower collector $C1\_3$ all events E that have a timestamp TMP dating one minute earlier than the last recorded event received from the former selected best collector C1_1. Of course, the periodicity of one minute is only a non-limitative example, a different periodicity may be applied.

In the example from FIG. 4, what was described above for verifying availability applies in the same way to upper collector C2_2 with relation to lower collector C1_1.

Of course, it will be noted that each step may be activated as soon as a best collector is selected by an upper collector, and every time a new best collector is selected by an upper collector.

The same is true with the periodic comparison of events from step 5) explained subsequently.

It will be noted that this verification step is done in non-limitative non-limitative embodiments, either asynchronously with relation to the moving of the following events 5) and 6), or synchronously, i.e., before or after each event movement or before or after each set of events movement.

In a fifth step 5) illustrated in FIG. 2 and FIG. 4, said upper level LSUP collector CSUP compares its events E with those from unselected lower level collectors CINF.

In a non-limitative embodiment, the step of comparing events E from an upper level collector CSUP with those from unselected lower level collectors CINF is carried out according to an hash HSH (called hash) associated with events E from said lower level collectors CINF.

An hash HSH enables an event to be identified. A hash is calculated for example by hashing functions that enable the integrity of data to be controlled. As hashing functions are known to the person skilled in the art, they are not described here. Thus, the hash HSH enables an event to be uniquely identified.

In a non-limitative embodiment, the step of comparing events E from an upper level collector CSUP with those from unselected lower level collectors CINF is also carried out according to a timestamp TMS. It will be noted that the timestamp TMS allows to certify the time of occurrence of an event (each event having a same time reference). A timestamp generally comprises the date and time the event occurs.

This also enables the classification of events and their search during the comparison step to be facilitated.

Thus, the timestamp TMS is combined with the HSH hash.

In the example taken from FIG. 4, upper collectors C2_1 and C2_2 compare their events E with those from unselected lower level collectors C1_2 to C1_n.

Thus, during the comparison, if an upper collector CSUP notices that it is missing events with relation to those saved in an unselected lower collector CINF, it recovers said events from said unselected lower collector CINF. This means that the selected lower level collector CINF lost recorded events E, and if so, the upper level collector CSUP receives the lost events from another lower level collector CINF (step RXd(CINF) illustrated in FIG. 2 and FIG. 4).

It will be noted that this comparison applies for all events recorded in an unselected collector, i.e., events issued from all source equipment S, events specific to said unselected lower collector, as well as events specific to other collectors from the same hierarchical level (since the latter events were also transmitted to unselected lower collectors).

In a non-limitative embodiment, the step of comparing the events from the upper level collector with those from unselected lower level collectors is carried out periodically.

In a non-limitative embodiment, the comparison is done in the following manner.

Figure 5:
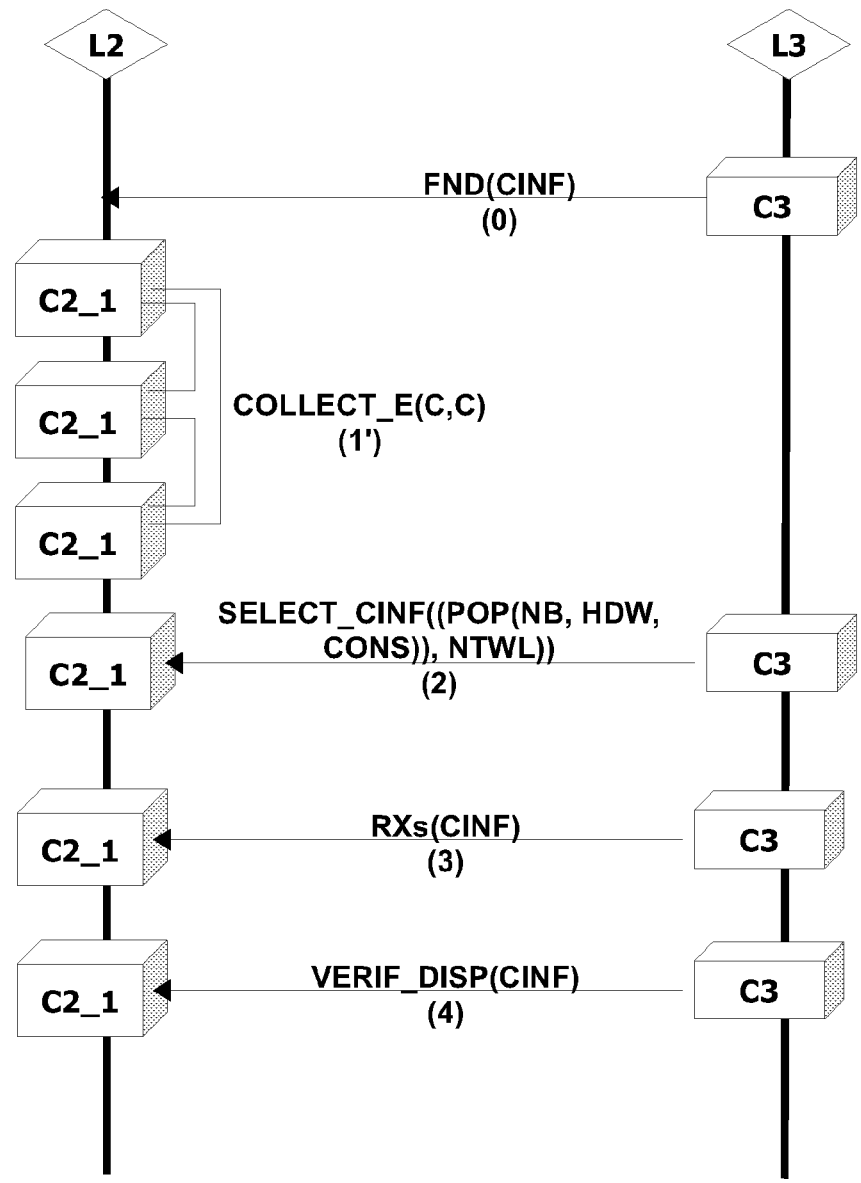
Figure 6:
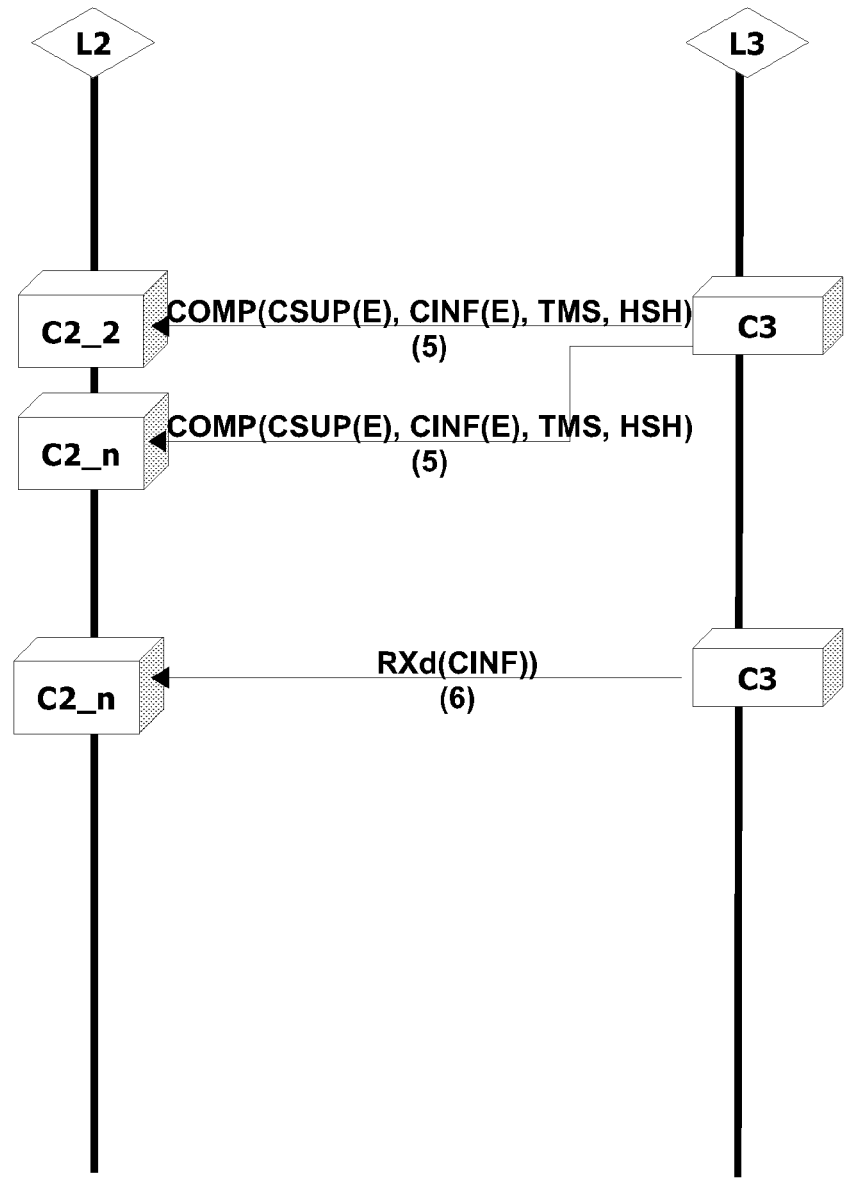

In the example from FIG. 5 the upper collector C2_1 periodically queries all unselected lower collectors C1 for their events E. The interrogation is done, in a non-limitative example, every minute. Each unselected lower collector, here C1_2 to C1_n, sends a response with the following information:

The timestamp TMP and hash HSH of each event E that the collector comprises since the previous minute.

Upper collector C2_1 thus compares its events E received since the last minute with the events E from each unselected lower collector C1 (C1_2, C1_n), and if the identification information (timestamp+hash) of at least one event E is different, this means that the selected lower collector C1_1 has lost events E.

In this case, upper collector C2_1 requests to receive the event or events E missing from the unselected lower collector C1 that comprises the missing events. For this purpose, upper collector C2_1 designates the missing event by sending to the relevant unselected lower collector C1 the timestamp TMP and hash HSH of the missing event E (that it compared previously). In the non-limitative example from FIG. 4, upper collector C2_1 recovers the missing events from the unselected lower collector C1_2.

In the example taken, what was described above also applies to upper collector C2_2.

It will be noted that the comparison is done by each upper collector CSUP.

Thus, in a sixth step 6) illustrated in FIG. 2 and FIG. 4, the upper collector CSUP receives from one of these unselected lower level collectors CINF the events that are different from its own (via the hash or via the hash plus the timestamp).

In a non-limitative embodiment, receiving events E is carried out for example according to the TCP/IP communication protocol. This protocol enables reliable receipt of events by an upper collector CSUP since said protocol ensures the arrival of data (events) without alteration, in order, with retransmission in case of loss, and eliminates duplicated data.

In the example taken from FIG. 4, upper collectors C2_1 and C2_2 thus receive events E from the unselected lower collector C1_2.

Thus, when each collector C2 has received lower level L1 events via at least one best lower collector C1, the steps of the centralizing method are repeated (See FIG. 5 and FIG. 6) by the collectors higher than collectors C2 to said collectors C2 (the latter becoming lower collectors), or here the collector C3 of upper level L3, as illustrated in FIG. 2.

Thus, the event centralizing method enables all events from a multilevel hierarchical system in a main collector CSUP to be automatically recovered without loss of events.

Figure 8:
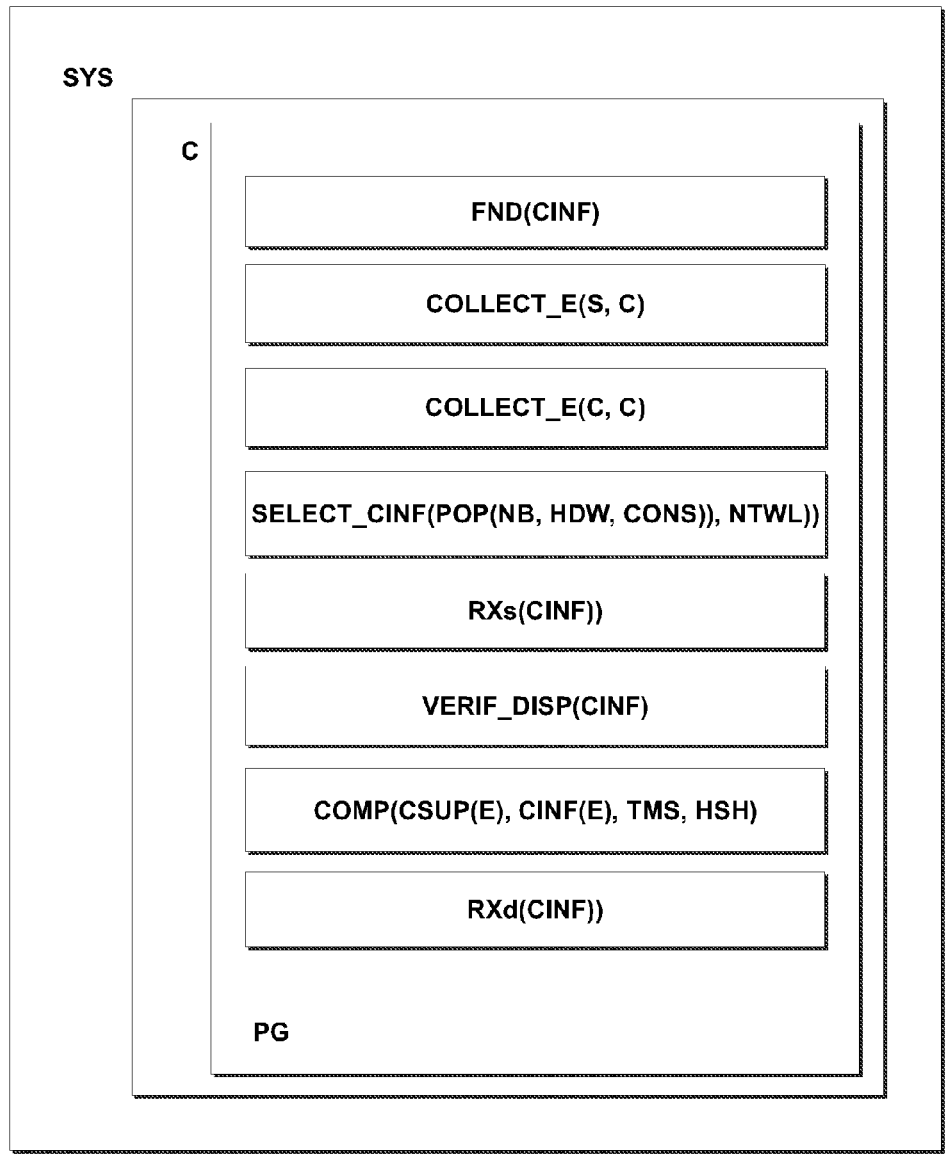
FIG. 8 illustrates in a simplified manner a multilevel hierarchical computer management system comprising a collector able to carry out the steps of the centralizing method from FIG. 2.

The event centralizing method is implemented by a multilevel hierarchical computer system SYS able to log events E generated by source equipment S, said system comprising a plurality of source equipment S generating events E and a plurality of collectors C of events E per level, as schematically illustrated in FIG. 8 according to a non-limitative embodiment.

More particularly, collector C for a multilevel hierarchical computer system SYS comprising a plurality of source equipment S generating events E and a plurality of event E collectors C per level is adapted to log the events E generated by source equipment S of said multilevel hierarchical computer management system SYS, and comprises:

means for selecting a collector CINF from a lower level LINF according to operational parameters POP and/or a link quality of service NTWL of said lower level LINF collector CINF;

means for receiving events from said selected lower level collector CINF;

means for verifying periodically the availability of the selected collector CINF and, if not available, means for repeating the selection step;

means for comparing its events E with those from the unselected lower level collectors CINF; and means for receiving events E that are different from one of these unselected lower level collectors CINF.

In a non-limitative embodiment, collector C also comprises means for recording all of the events E generated by source equipment S of the same hierarchical level.

It will be noted that the implementation of the method stated above may be performed by means of a microprogrammed "software" device, a wired logic and/or "hardware" electronic components.

Thus, the multilevel hierarchical computer management system SYS may comprise one or more computer program products PG comprising one or more sequences of instructions executable by an information processing unit such as a microprocessor, or a microcontroller processing unit, ASIC, computer, etc., the execution of said instruction sequences enabling an implementation of the method described.

Such a computer program PG may be written in ROM type writable nonvolatile memory or in EEPROM or FLASH type rewritable nonvolatile memory. Said computer program PG may be written into memory in the factory or else loaded into memory or remotely downloaded into memory. The instruction sequences may be machine instruction sequences or else sequences of a command language interpreted by the processing unit when they are executed.

In the non-limitative example from FIG. 8, the computer program PG is written into a memory of a collector C. In this case, in a non-limitative embodiment, one may plan to activate the execution of instruction sequences depending on whether the program is executed in an upper level collector or in a lower level collector or in a lower collector belonging to the lowest level (or in the example from FIG. 2 the level L1). In fact, in the latter case, only the step of recording all events E generated by source equipment S of the same hierarchical level will be executed.

Of course, the description is not limited to the application, modes of embodiment or examples described above.

Thus, other parameters than those cited previously may be taken into account for selecting the best lower collector. Thus, in a non-limitative example, a criterion that limits the number of upper collectors to which a lower collector may move events may be taken into account. In fact, the smaller the number, the lesser the overload of the network link between the lower collector and an upper collector and the better the transmission of events will be.

Thus, in the case where collectors from a lower level would all be unavailable, in a non-limitative embodiment, a timeout may be placed in the upper collector to verify if a lower collector has become available again.

Thus, the invention described presents, in particular, the following advantages:

the invention is easy to implement;

the invention prevents replication of all events from collectors of one level into all collectors of another level;

the invention enables the selection of the best lower collector at a given time;

the invention avoids the loss of events if a collector is faulty or if a link is broken between a lower collector and an upper collector for example;

the invention enables events contained in an upper collector to be synchronized with those from the best lower collector at a given time, which prevents having duplications and thus false intrusion alerts, for example;

the invention enables events to be reliably moved between a lower level and an upper level due to the use of the TCP/IP protocol;

the invention enables events to be moved from a single collector at a given time, which prevents congestion on the communication links;

the invention ensures the collection of events at the upper level from a lower collector that, being the best, will be the collector that will lose the fewest events and thus will be the most representative of events generated by source equipment, in particular;

the invention guarantees, thanks to the verification of the availability of the collector selected, good event centralizing operation. In fact, there is no more risk that an upper collector trusts a lower collector that is no longer available, and thus there is much less risk of error on the movement of events;

the invention enables a complete supervision of all events from a multilevel hierarchical computer system by an upper collector situated at the highest level; and the invention enables the upper collector situated at the highest level to perform mathematical calculations (ex.: Aggregation or correlation) in real time, even in case of loss of availability of a collector or a link between the lower collector and the upper collector situated at the highest level.

The invention claimed is:

1. A method for centralizing events by a main collector for a multilevel hierarchical computer management system comprising at least a first level below the main collector and a second level below the first level, said system comprising a plurality of sources generating events and a plurality of event collectors, said method comprising:

collecting, by the collectors, at each level, the events from each source, transmitted, at least for one of the sources, to a plurality of the collectors, and said method comprising, for each upper collector:

selecting by said upper level collector of one of the lower level collectors among a plurality of available lower level collectors linked to said upper collector, said selecting being made according to operational parameters and/or a link quality of service of said lower level collector, wherein the operational parameters comprise material capacities and/or consumption parameters and/or a number of events;

receiving by said upper level collector the events from said selected lower level collector;

periodically verifying if the selected lower level collector is available and if not repeating the selecting;

comparing by said upper level collector the received events with events of the unselected available lower level collectors by sending, by each of these unselected available lower level collectors, an identifier of each event comprised by this unselected lower collector, designating, based on the comparing, missing events by sending to the relevant unselected lower collector a request for each missing event, and receiving each missing event from the relevant unselected lower collector.

2. The event centralizing method according to claim 1, wherein said comparing by said upper level collector is carried out periodically.

3. The event centralizing method according to claim 1, wherein the receiving of events is carried out according to the TCP/IP communication protocol.

4. The event centralizing method according to claim 1, comprising searching for the available lower level collectors by the upper level collector.

5. The event centralizing method according to claim 1, comprising transmitting by at least one of the collectors its own received events to at least one other collector of the same first or second level.

6. The event centralizing method according to claim 1, comprising, transmitting, according to the UDP communication protocol, by at least one of the collectors its own received events to at least one other collector of the same first or second level.

7. A collector management system comprising a main collector and a plurality of collectors disposed in at least a first level and a second level of a multilevel hierarchical computer network, wherein the first level is placed below the main collector and the second level is placed below the first level, said computer network comprising a plurality of sources disposed at said first and second levels and configured to generate events, said management system comprising a plurality of event collectors each placed at said first or second level, said collector management system being configured to:
   log events generated by the sources, at each level, by the collectors, wherein at least for one of the sources transmits events to a plurality of the collectors equipments of said multilevel hierarchical computer network management system,
   each upper collector being configured to:
   select one of the lower level collectors among a plurality of available lower level collectors linked to said upper collector, according to operational parameters and/or a link quality of service of said lower level collector, wherein the operational parameters comprise material capacities and/or consumption parameters and/or a number of events;
   receive events from said selected lower level collector;
   verify periodically the availability of the selected lower level collector and, if not available, select again one of the lower level collectors among a plurality of available lower level collectors linked to said upper collector;
   compare the received events with events of the unselected available lower level collector; wherein each of these unselected available lower level collectors send an identifier of each comprised event and
   designate missing events by sending to each relevant unselected lower collector a request for each missing event,
   receive each missing event from each relevant unselected lower level collector.

8. The collector management system according to claim 7, wherein each collector is further configured to record all of the events generated by sources of the same hierarchical level.

9. A non-transitory machine readable medium comprising one or more sequences of instructions executable by a processing unit, the execution of said instruction sequences by said processing unit enabling an implementation of the method according claim 1.

10. A collector management system comprising a main collector and a plurality of collectors disposed in at least a first level and a second level of a multilevel hierarchical computer network, wherein the first level is placed below the main collector and the second level is placed below the first level, said computer network comprising a plurality of sources disposed at said first and second levels and configured to generate events, said management system comprising a plurality of event collectors each placed at said first or second level, wherein said collectors are configured to log events generated by the sources, at each level of said multilevel hierarchical computer network,
   wherein each upper collector comprises a memory encoded with machine readable instructions for
   selecting one lower level collector among a plurality of available lower level collectors linked to said upper collector, according to operational parameters and/or a link quality of service of said lower level collector, wherein the operational parameters comprise material capacities and/or consumption parameters and/or a number of events;
   receiving events from said selected lower level collector;
   periodically verifying if the selected lower level collector is available and if not repeating the selecting; and
   comparing the received events with events of the unselected available lower level collectors, wherein each of these unselected available lower level collectors send a timestamp and a hash of each event comprised by this lower level collector since a determined period of time, and
   receiving each missing event from the relevant unselected lower level collector.

11. A method for centralizing events by a main collector for a multilevel hierarchical computer management system comprising at least a first level below the main collector and a second level below the first level, said system comprising a plurality of sources generating events and a plurality of event collectors, said method comprising:
   collecting, by the collectors, at each level, the events from each source transmitted, at least for one of the sources, to a plurality of the collectors,
   and said method comprising, for each upper collector:
   selecting by said upper level collector of one of the lower level collectors among a plurality of available lower level collectors linked to said upper collector, said selecting being made according to operational parameters and/or a link quality of service of said lower level collector, wherein the operational parameters comprise material capacities and/or consumption parameters and/or a number of events;
   receiving by said upper level collector the events from said selected lower level collector;
   periodically verifying if the selected lower level collector is available and if not repeating the selecting;
   comparing by said upper level collector the received events with events of the unselected available lower level collectors by sending, by each of these unselected available lower level collectors, a timestamp and a hash of each event comprised by this lower level collector since a determined period of time,
   designating, based on the comparing, missing events by sending to the relevant unselected lower collector the timestamp and the hash of each missing event, and
   receiving each missing event from the relevant unselected lower collector.

12. The method as in claim 11, wherein said determined period of time corresponds to one minute.

13. The method as in claim 11, wherein said comparing by said upper level collector is carried out periodically.

14. The method as in claim 11, comprising searching for the available lower level collectors by the upper level collector.

15. The method as in claim 11, comprising transmitting by at least one of the collectors its own received events to at least one other collector of the same first or second level.

\* \* \* \* \*